US010294142B2

(12) United States Patent
Zhang et al.

(10) Patent No.: US 10,294,142 B2
(45) Date of Patent: May 21, 2019

(54) HIGH MODULUS GLASS FIBRE COMPOSITION, AND GLASS FIBRE AND COMPOSITE MATERIAL THEREOF

(71) Applicant: JUSHI GROUP CO., LTD., Tongxiang (CN)

(72) Inventors: Yuqiang Zhang, Tongxiang (CN); Guorong Cao, Tongxiang (CN); Lin Zhang, Tongxiang (CN); Wenzhong Xing, Tongxiang (CN); Guijiang Gu, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 0 days.

(21) Appl. No.: 16/066,284

(22) PCT Filed: Mar. 7, 2016

(86) PCT No.: PCT/CN2016/075781

§ 371 (c)(1),
(2) Date: Jun. 26, 2018

(87) PCT Pub. No.: WO2016/165507

PCT Pub. Date: Oct. 20, 2016

(65) Prior Publication Data

US 2019/0010077 A1 Jan. 10, 2019

(30) Foreign Application Priority Data

Feb. 29, 2016 (CN) .......................... 2016 1 0112748

(51) Int. Cl.

| | |
|---|---|
| ***C03C 3/095*** | (2006.01) |
| ***C03C 13/00*** | (2006.01) |
| ***C03C 3/087*** | (2006.01) |
| ***C03C 3/078*** | (2006.01) |

(52) U.S. Cl.

CPC .............. *C03C 3/095* (2013.01); *C03C 3/078* (2013.01); *C03C 3/087* (2013.01); *C03C 13/00* (2013.01); *C03C 2213/00* (2013.01)

(58) Field of Classification Search

CPC ....... C03C 13/00; C03C 3/095; C03C 13/046; C03C 3/078; C03C 3/87

See application file for complete search history.

(56) References Cited

U.S. PATENT DOCUMENTS

| | | | | |
|---|---|---|---|---|
| 9,156,729 B2 | 10/2015 | McGinnis et al. | | |
| 2010/0093510 A1 | 4/2010 | Tanaka et al. | | |
| 2013/0143459 A1 | 6/2013 | Li et al. | | |
| 2015/0018194 A1* | 1/2015 | Li | .......................... | C03C 13/00 501/38 |
| 2016/0068428 A1* | 3/2016 | Li | .......................... | C03C 13/00 501/38 |
| 2016/0326045 A1* | 11/2016 | Li | .......................... | C03C 13/00 |
| 2017/0101338 A1* | 4/2017 | Li | .......................... | C03C 13/00 |
| 2018/0179103 A1* | 6/2018 | Zhang | .................... | C03C 13/00 |
| 2018/0179104 A1* | 6/2018 | Zhang | .................... | C03C 13/00 |
| 2018/0186688 A1* | 7/2018 | Zhang | .................... | C03C 13/00 |
| 2018/0208497 A1* | 7/2018 | Zhang | .................... | C03C 3/087 |

FOREIGN PATENT DOCUMENTS

| | | |
|---|---|---|
| CN | 102849958 A | 1/2013 |
| CN | 103086605 A | 5/2013 |
| CN | 103221354 A | 7/2013 |
| CN | 104743888 A | 7/2015 |
| RU | 2469001 C2 | 12/2012 |
| WO | 2014062715 A1 | 4/2014 |
| WO | 2015009686 A1 | 1/2015 |

OTHER PUBLICATIONS

International Search Report for PCT/CN2016/075781 dated Feb. 2, 2017 and its English translation provided by WIPO.
Written Opinion of the International Search Authority PCT/CN2016/075781 dated Nov. 30, 2016 and its English translation provided by Google Translate.
International Search Report for PCT/CN2016/075781 dated Nov. 25, 2016 and its English translation provided by Patentscope.
Written Opinion of the International Search Authority for PCT/CN2016/075781 dated Nov. 25, 2016 and its English translation provided by Google Translate.
First Search for corresponding Chinese Application No. 201610112748.X dated Sep. 11, 2017.
Office Action for corresponding Chinese Application No. 201610112748.X dated Sep. 26, 2017. Translation provided by Espacenet.
Notification to Grant Patent Right for corresponding Chinese Application No. 201610112748.X dated May 23, 2018.
From KR application No. 20187023041, Notification of Reason for Refusal, dated Jan. 14, 2019, with machine English translation from Global Dossier.
From PCT/CN2016/075781, Written Opinion of the International Searching Authority, dated Nov. 25, 2016, with English translation from WIPO.

(Continued)

*Primary Examiner* — Elizabeth A. Bolden
(74) *Attorney, Agent, or Firm* — Ladas & Parry, LLP

(57) ABSTRACT

A high modulus glass fiber composition, and a glass fiber and a composite material thereof. The glass fiber composition comprises the following components expressed as percentage by weight: 53-68% of $SiO_2$, 13-24.5% of $Al_2O_3$, 0.1-8% of $Y_2O_3$+$La_2O_3$, less than 1.8% of $La_2O_3$, 10-23% of CaO+MgO+SrO, less than 2% of $Li_2O$+$Na_2O$+$K_2O$, and less than 1.5% of $Fe_2O_3$, and the range of a weight percentage ratio C1 is more than 0.5, wherein $C1=Y_2O_3/(Y_2O_3+La_2O_3)$. The composition significantly increases the elastic modulus of glass, significantly reduces the liquidus temperature and the forming temperature of glass, and under equal conditions, significantly reduces the crystallization rate and the bubble rate of glass. The composition effectively improves the material properties of glass, and is particularly suitable for the tank furnace production of a high modulus glass fiber having a low bubble rate.

19 Claims, No Drawings

(56) References Cited

OTHER PUBLICATIONS

From PCT/CN2016/075781, International Preliminary Report on Patentability, dated Sep. 4, 2018, with English translation from WIPO.
From JP App. No. 2018542153, Notice of Reasons for Refusal, dated Feb. 19, 2019, with machine English translation provided by Google Translate.
From RU App. No. 2018124358/03(038573), Office Action dated Feb. 15, 2019, with machine English translation provided by Google Translate.

* cited by examiner

HIGH MODULUS GLASS FIBRE COMPOSITION, AND GLASS FIBRE AND COMPOSITE MATERIAL THEREOF

CROSS-REFERENCE TO RELATED APPLICATIONS

The present application is the U.S. national phase of PCT Application PCT/CN2016/075781 filed on Mar. 7, 2016 which claims a priority to Chinese Patent Application No. 201610112748.X filed Feb. 29, 2016, the disclosures of which are incorporated herein by reference in their entireties.

BACKGROUND OF THE INVENTION

Field of the Invention

The present invention relates to a high modulus glass fiber, a composition for producing the same, and a composite material comprising the same.

Description of the Related Art

Glass fiber is an inorganic fiber material that can be used to reinforce resins to produce composite materials with good performance. As a reinforcing base material for advanced composite materials, high-modulus glass fibers were originally used mainly in the aerospace industry or the national defense industry. With the progress of science and technology and the development of economy, high-modulus glass fibers have been widely used in civil and industrial fields such as wind blades, pressure vessels, offshore oil pipes and auto industry.

The original high-modulus glass compositions were based on an $MgO—Al_2O_3—SiO_2$ system and a typical solution was S-2 glass of American company OC. The modulus of S-2 glass is 89-90 GPa; however, the production of this glass is excessively difficult, as its forming temperature is up to about 1571° C. and its liquidus temperature up to 1470° C. and therefore it is difficult to realize large-scale industrial production. Thus, OC stopped production of S-2 glass fiber and transferred its patent to American company AGY.

Thereafter, OC, developed HiPer-tex glass having a modulus of 87-89 GP, which were a trade-off for production scale by sacrificing some of the glass properties. However, as the design solution of HiPer-tex glass was just a simple improvement over that of S-2 glass, the forming temperature and liquidus temperature remained high, which causes difficulty in attenuating glass fiber and consequently in realizing large-scale industrial production. Therefore, OC also stopped production of HiPer-tex glass fiber and transferred its patent to the European company 3B.

French company Saint-Gobain developed R glass that is based on an $MgO—CaO—Al_2O_3—SiO_2$ system, and its modulus is 86-89 GPa; however, the total contents of $SiO_2$ and $Al_2O_3$ remain high in the traditional R glass, and there is no effective solution to improve the crystallization performance, as the ratio of Ca to Mg is inappropriately designed, thus causing difficulty in fiber formation as well as a great risk of crystallization, high surface tension and fining difficulty of molten glass. The forming temperature of the R glass reaches 1410° C. and its liquidus temperature up to 1350° C. All these have caused difficulty in effectively attenuating glass fiber and consequently in realizing large-scale industrial production.

In China, Nanjing Fiberglass Research & Design Institute developed an HS2 glass having a modulus of 84-87 GPa. It primarily contains $SiO_2$, $Al_2O_3$ and MgO while also including certain amounts of $Li_2O$, $B_2O_3$, $CeO_2$ and $Fe_2O_3$. Its forming temperature is only 1245° C. and its liquidus temperature is 1320° C. Both temperatures are much lower than those of S glass. However, since its forming temperature is lower than its liquidus temperature, which is unfavorable for the control of glass fiber attenuation, the forming temperature has to be increased and specially-shaped tips have to be used to prevent a glass crystallization phenomenon from occurring in the fiber attenuation process. This causes difficulty in temperature control and also makes it difficult to realize large-scale industrial production.

In general, the above-mentioned prior art for producing high modulus glass fiber faces such difficulties as relatively high liquidus temperature, high crystallization rate, relatively high forming temperature, high surface tension of the glass, high difficulty in refining molten glass, and a narrow temperature range (ΔT) for fiber formation. Thus, the prior art generally fails to enable an effective large-scale production of high modulus glass fiber.

SUMMARY OF THE INVENTION

It is one objective of the present disclosure to provide a composition for producing a high modulus glass fiber. The composition can not only significantly improve the elastic modulus of the glass fiber, but also overcome the technical problems in the manufacture of traditional high-modulus glasses including high crystallization risk, high difficulty in refining molten glass and low rate in hardening molten glass. The composition can also significantly reduce the liquidus temperature and forming temperature of high-modulus glasses, and under equal conditions, significantly reduce the crystallization rate and the bubble rate of glass, and is particularly suitable for the tank furnace production of a high modulus glass fiber having a low bubble rate.

To achieve the above objective, in accordance with one embodiment of the present disclosure, there is provided a composition for producing a high modulus glass fiber, the composition comprising percentage amounts by weight, as follows:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | <1.8% |
| $CaO + MgO + SrO$ | 10-23% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5.

In a class of this embodiment, the weight percentage ratio $C2=(Li_2O+Na_2O+K_2O)/(Y_2O_3+La_2O_3)$ is greater than 0.2.

In a class of this embodiment, the content range of $Li_2O$ is 0.1-1.5% by weight.

In a class of this embodiment, the content range of $La_2O_3$ is 0.05-1.7% by weight.

In a class of this embodiment, the content range of $La_2O_3$ is 0.1-1.5% by weight.

In a class of this embodiment, the weight percentage ratio $C1=Y_2O_3/(Y_2O_3+La_2O_3)$ is greater than 0.55.

In a class of this embodiment, the weight percentage ratio $C2=(Li_2O+Na_2O+K_2O)/(Y_2O_3+La_2O_3)$ is greater than 0.22.

In a class of this embodiment, the weight percentage ratio $C2=(Li_2O+Na_2O+K_2O)/(Y_2O_3+La_2O_3)$ is greater than 0.26.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | <1.8% |
| CaO + MgO + SrO | 10-23% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | 0.05-1.7% |
| CaO + MgO + SrO | 10-23% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O))/(Y_2O_3+La_2O_3)$ is greater than 0.2.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $Y_2O_3$ | 0.1-6.3% |
| $La_2O_3$ | 0.05-1.7% |
| CaO + MgO + SrO | 10-23% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $Y_2O_3$ | 0.1-6.3% |
| $La_2O_3$ | 0.05-1.7% |
| CaO + MgO + SrO | 10-23% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

In a class of this embodiment, the content range of CaO is less than 12% by weight.

In a class of this embodiment, the content range of CaO is 2-11% by weight.

In a class of this embodiment, the total content of $Y_2O_3+La_2O_3$ is 0.5-7% by weight.

In a class of this embodiment, the total content of $Y_2O_3+La_2O_3$ is 1.5-6% by weight.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | <12% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

In a class of this embodiment, the composition comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.3-6% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

In a class of this embodiment, the composition comprises the following components expressed as percentage amounts by weight:

| | |
|---|---|
| $SiO_2$ | 54-64% |
| $Al_2O_3$ | 14-24% |
| $Y_2O_3 + La_2O_3$ | 0.5-7% |
| $Y_2O_3$ | 0.3-6% |
| $La_2O_3$ | 0.1-1.5% |
| CaO + MgO + SrO | 10-23% |
| CaO | 2-11% |
| $Li_2O$ | 0.1-1.5% |

-continued

| | |
|---|---|
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.55, and the weight percentage ratio $C2=(Li_2O+Na_2O+K_2O)/(Y_2O_3+La_2O_3)$ is greater than 0.2.

In a class of this embodiment, the composition comprises the following components expressed as percentage amounts by weight:

| | |
|---|---|
| $SiO_2$ | 54-64% |
| $Al_2O_3$ | 14-24% |
| $Y_2O_3 + La_2O_3$ | 0.5-7% |
| $Y_2O_3$ | 0.3-6% |
| $La_2O_3$ | 0.1-1.5% |
| CaO + MgO + SrO | 12-22% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.55, and the weight percentage ratio $C2=(Li_2O+Na_2O+K_2O)/(Y_2O_3+La_2O_3)$ is greater than 0.22.

In a class of this embodiment, the composition comprises the following components expressed as percentage amounts by weight:

| | |
|---|---|
| $SiO_2$ | 54-64% |
| $Al_2O_3$ | 14-24% |
| $Y_2O_3 + La_2O_3$ | 1.5-6% |
| $Y_2O_3$ | 1-5.5% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.6, and the weight percentage ratio $C2=(Li_2O+Na_2O+K_2O)/(Y_2O_3+La_2O_3)$ is greater than 0.22.

In a class of this embodiment, the weight percentage ratio $C1=Y_2O_3/(Y_2O_3+La_2O_3)$ is greater than 0.65.

In a class of this embodiment, the weight percentage ratio $C1=Y_2O_3/(Y_2O_3+La_2O_3)$ is 0.7-0.95.

In a class of this embodiment, the composition comprises the following components expressed as percentage amounts by weight:

| | |
|---|---|
| $SiO_2$ | 54-64% |
| $Al_2O_3$ | 14-24% |
| $Y_2O_3 + La_2O_3$ | 1.5-6% |
| $Y_2O_3$ | 1-5.5% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is 0.7-0.95, and the weight percentage ratio $C2=(Li_2O+Na_2O+K_2O)/(Y_2O_3+La_2O_3)$ is greater than 0.26.

In a class of this embodiment, the content range of SrO is less than 2% by weight.

In a class of this embodiment, the content range of SrO is 0.1-1.5% by weight.

In a class of this embodiment, the content range of MgO is 8.1-12% by weight.

In a class of this embodiment, the content range of MgO is greater than 12% and less than or equal to 14% by weight.

In a class of this embodiment, the composition comprises the following components expressed as percentage amounts by weight:

| | |
|---|---|
| $SiO_2$ | 53-68% |
| $Al_2O_3$ | greater than 19% and less than or equal to 23% |
| $Y_2O_3 + La_2O_3$ | 0.1-8% |
| $La_2O_3$ | 0.05-1.7% |
| CaO + MgO + SrO | 10-23% |
| MgO | <11% |
| $Li_2O + Na_2O + K_2O$ | <1% |
| $Fe_2O_3$ | <1.5% |

In addition, the weight percentage ratio $C1=Y_2O_3/(Y_2O_3+La_2O_3)$ is greater than 0.5.

In a class of this embodiment, the composition contains $TiO_2$ with a content range of 0.1-3% by weight.

In a class of this embodiment, the composition contains $ZrO_2$ with a content range of 0-2% by weight.

In a class of this embodiment, the composition contains $CeO_2$ with a content range of 0-1% by weight.

In a class of this embodiment, the composition contains $B_2O_3$ with a content range of 0-2% by weight.

According to another aspect of this invention, a glass fiber produced with the composition for producing a glass fiber is provided.

In addition, the glass fiber has an elastic modulus greater than 90 Gpa.

In addition, the glass fiber has an elastic modulus greater than 95 Gpa.

According to yet another aspect of this invention, a composite material incorporating the glass fiber is provided.

The main inventive points of the composition for producing a glass fiber according to this invention lie in that it introduces rare earth oxides $Y_2O_3$ and $La_2O_3$ to make use of the synergistic effect there between, keeps tight control on the ratios of $Y_2O_3/(Y_2O_3+La_2O_3)$ and $(Li_2O+Na_2O+K_2O)/(Y_2O_3+La_2O_3)$ respectively, reasonably configures the content ranges of $Y_2O_3$, $La_2O_3$, $Li_2O$, CaO, MgO and CaO+MgO+SrO, utilizes the mixed alkali earth effect of CaO, MgO and SrO and the mixed alkali effect of $K_2O$, $Na_2O$ and $Li_2O$, and selectively introduces appropriate amounts of $TiO_2$, $ZrO_2$, $CeO_2$ and $B_2O_3$.

Specifically, the composition for producing a glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | <1.8% |
| CaO + MgO + SrO | 10-23% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5.

The effect and content of each component in the composition for producing a glass fiber is described as follows:

$SiO_2$ is a main oxide forming the glass network and has the effect of stabilizing all the components. In the composition for producing a glass fiber of the present invention, the content range of $SiO_2$ is 53-68%. Preferably, the $SiO_2$ content range can be 54-64%.

$Al_2O_3$ is another main oxide forming the glass network. When combined with $SiO_2$, it can have a substantive effect on the mechanical properties of the glass. The content range of $Al_2O_3$ in this invention is 13-24.5%. Too low of an $Al_2O_3$ content will make it impossible to obtain sufficiently high mechanical properties; too high of a content will significantly increase the viscosity of glass, thereby causing melting and refining difficulties. Preferably, the $Al_2O_3$ content can be 14-24%. In addition, the inventors have unexpectedly found in an embodiment that, when the weight percentage of $Al_2O_3$ is controlled to be greater than 19% and less than or equal to 23%, the weight percentage of MgO to be less than or equal to 11% and the total weight percentage of $Li_2O+Na_2O+K_2O$ to be less than or equal to 1%, the glass can have exceptionally high modulus, excellent crystallization resistance and a wide temperature range ($\Delta T$) for fiber formation.

$Y_2O_3$ is an important rare earth oxide. The inventors find that $Y_2O_3$ plays a particularly effective role in increasing the glass modulus and inhibiting the glass crystallization. As it is hard for $Y^{3+}$ ions to enter the glass network, it usually exists as external ions at the gaps of the glass network, $Y^{3+}$ ions have large coordination numbers, high field strength and electric charge, and high accumulation capability. Due to these features, $Y^{3+}$ ions can help to improve the structural stability of the glass and increase the glass modulus, and meanwhile effectively prevent the movement and arrangement of other ions so as to inhibit the crystallization tendency of the glass. $La_2O_3$ is also an important rare earth oxide. The inventors have found that, when used alone, $La_2O_3$ obviously shows a weaker effect in increasing the glass modulus and inhibiting the crystallization, as compared with $Y_2O_3$. However, when these two oxides are used simultaneously with an appropriate weight percentage ratio there between, a remarkable synergistic effect will be achieved unexpectedly. Such effect is better than that obtained with the use of $Y_2O_3$ or $La_2O_3$ alone for increasing the glass modulus and inhibiting the crystallization. The inventors hold that, although $Y_2O_3$ and $La_2O_3$ are of an oxide of the same type sharing similar physical and chemical properties, the two oxides differ from each other in terms of coordination state in that yttrium ions generally are hexa-coordinated while lanthanum ions are octahedral. Therefore, the simultaneous use of these two oxides, with the weight percentage ratio $C1=Y_2O_3/(Y_2O_3+La_2O_3)$ greater than 0.5, would render the following advantages: (1) more coordination states of the ions outside the glass network would be produced, which helps to enhance the glass stability and modulus; (2) the hexa-coordination of yttrium ions assisted by the octahedron of lanthanum ions would further enhance the structural integrity and modulus of the glass; and (3) it would be less likely for the ions to form regular arrangements at lowered temperatures, which help to significantly reduce the growth rate of crystal phases and thus further increase the resistance to glass crystallization. In addition, lanthanum oxide can improve the refining effect of molten glass. However, the molar mass and ionic radiuses of lanthanum are both big and an excessive amount of lanthanum ions would affect the structural stability of the glass, so the introduced amount of $La_2O_3$ should be limited.

In the composition for producing a glass fiber of the present invention, the combined content range of $Y_2O_3+La_2O_3$ can be 0.1-8%, preferably can be 0.5-7%, and more preferably can be 1.5-6%. Meanwhile, the weight percentage ratio $C1=Y_2O_3/(Y_2O_3+La_2O_3)$ is greater than 0.5. Preferably, the ratio can be greater than 0.55. Preferably, the ratio can be greater than 0.6. Preferably, the ratio can be greater than 0.65. Preferably, the range of the ratio can be 0.7-0.95. In addition, the content range of $La_2O_3$ can be less than 1.8%, preferably 0.05-1.7%, and more preferably 0.1-1.5%. Further, the $Y_2O_3$ content can be 0.1-6.3%, preferably 0.3-6%, and more preferably 1-5.5%.

The inventors also find that the synergistic effect of the above two rare earth oxides is closely related to the free oxygen content in the glass. $Y_2O_3$ in crystalline state has vacancy defects and, when $Y_2O_3$ are introduced to the glass, these vacancy defects would be filled by other oxides, especially alkali metal oxides. Different filling degrees would lead to different coordination state and stacking density of $Y_2O_3$, thus having a significant effect on the glass properties. Similarly, $La_2O_3$ also needs a large amount of oxygen to fill the vacancies. In order to acquire sufficient free oxygen and accordingly achieve a more compact stacking structure and better crystallization resistance, the range of the weight percentage ratio $C2=(Li_2O+Na_2O+K_2O)/(Y_2O_3+La_2O_3)$ in the present invention is greater than 0.2, preferably greater than 0.22, and more preferably greater than 0.26.

Both $K_2O$ and $Na_2O$ can reduce glass viscosity and are good fluxing agents. The inventors have found that, replacing $Na_2O$ with 120 while keeping the total amount of alkali metal oxides unchanged can reduce the crystallization tendency of glass and improve the fiber forming performance. Compared with $Na_2O$ and $K_2O$, $Li_2O$ can not only significantly reduce glass viscosity thereby improving the glass melting performance, but also obviously help improve the mechanical properties of glass. In addition, a small amount of $Li_2O$ provides considerable free oxygen, which helps more aluminum ions to form tetrahedral coordination, enhances the network structure of the glass and further improves the mechanical properties of glass. However, as too many alkali metal ions in the glass composition would affect the corrosion resistance of the glass, the introduced amount should be limited. Therefore, in the composition for producing a glass fiber of the present invention, the total content range of $Li_2O+Na_2O+K_2O$ is lower than 2%. Further, the content range of $Li_2O$ is 0.1-1.5%.

CaO, MgO and SrO primarily have the effect of controlling the glass crystallization and regulating the glass viscosity and the hardening rate of molten glass. Particularly on the control of the glass crystallization, the inventors have obtained unexpected effects by controlling the introduced amounts of them and the ratios between them. Generally, for a high-performance glass based on the MgO—CaO—$Al_2O_3$—$SiO_2$ system, the crystal phases it contains after glass crystallization include mainly diopside ($CaMgSi_2O_6$) and anorthite ($CaAl_2Si_2O_3$). In order to effectively inhibit the tendency for these two crystal phases to crystallize and decrease the glass liquidus temperature and the rate of crystallization, this invention has rationally controlled the total content of CaO+MgO+SrO and the ratios between them and utilized the mixed alkali earth effect to form a compact stacking structure, so that more energy are needed for the crystal nucleases to form and grow. In this way, the glass crystallization tendency is inhibited and the hardening performance of molten glass is optimized. Further, a glass system containing strontium oxide has more stable glass structure, thus improving the glass properties. In the composition for producing a glass fiber of the present invention, the range of the total content of CaO+MgO+SrO is 10-23%, and preferably 12-22%.

As a network modifier, too much CaO would increase the crystallization tendency of the glass that lead to the precipitation of crystals such as anorthite and wollastonite in the glass melt. Therefore, the content range of CaO can be less than 12%, and preferably can be 2-11%. MgO has the similar effect in the glass network as CaO, yet the field strength of $Mg^{2+}$ is higher, which plays an important role in increasing the glass modulus. Furthermore, in one embodiment of the present invention, the content range of MgO can be 8.1-12%; in another embodiment of the present invention, the content range of MgO can be greater than 12% and less than or equal to 14%. Furthermore, the content range of SrO can be lower than 2%, and preferably can be 0.1-1.5%.

$Fe_2O_3$ facilitates the melting of glass and can also improve the crystallization performance of glass. However, since ferric ions and ferrous ions have a coloring effect, the introduced amount should be limited. Therefore, in the composition for producing a glass fiber of the present invention, the content range of $Fe_2O_3$ is lower than 1.5%.

In the composition for producing a glass fiber of the present invention, appropriate amounts of $TiO_2$, $ZrO_2$, $CeO_2$ and $B_2O_3$ can be selectively introduced to further increase the glass modulus and improve the glass crystallization and refining performance. In the composition for producing a glass fiber of the present invention, the $TiO_2$ content can be 0.1-3%, the $ZrO_2$ content can be 0-2%, the $CeO_2$ content can be 0-1%, and the $B_2O_3$ content can be 0-2%.

In addition, the composition for producing a glass fiber of the present invention can include small amounts of other components with a total content not greater than 2%.

In the composition for producing a glass fiber of the present invention, the beneficial effects produced by the aforementioned selected ranges of the components will be explained by way of examples through the specific experimental data.

The following are examples of preferred content ranges of the components contained in the composition for producing a glass fiber according to the present invention.

Composition 1

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | 0.05-1.7% |
| CaO + MgO + SrO | 10-23% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

According to Composition 1, the resulting glass fiber has an elastic modulus greater than 90 GPa.

Composition 2

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $Y_2O_3$ | 0.1-6.3% |
| $La_2O_3$ | 0.05-1.7% |
| CaO + MgO + SrO | 10-23% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

Composition 3

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $Y_2O_3$ | 0.1-6.3% |
| $La_2O_3$ | 0.05-1.7% |
| CaO + MgO + SrO | 10-23% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

Composition 4

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | <12% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

Composition 5

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

Composition 6

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.3-6% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O_3)$ is greater than 0.2.

Composition 7

The composition for producing a high modulus glass fiber according to the present invention comprises the following components expressed as percentage amounts by weight:

| | |
|---|---|
| $SiO_2$ | 54-64% |
| $Al_2O_3$ | 14-24% |
| $Y_2O_3 + La_2O_3$ | 0.5-7% |
| $Y_2O_3$ | 0.3-6% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.55, and the weight percentage ratio $C2=(Li_2O+Na_2O+K_2O)/(Y_2O_3+La_2O_3)$ is greater than 0.2.

Composition 8

The composition for producing a high modulus glass fiber according to the present invention comprises the following components expressed as percentage amounts by weight:

| | |
|---|---|
| $SiO_2$ | 54-64% |
| $Al_2O_3$ | 14-24% |
| $Y_2O_3 + La_2O_3$ | 0.5-7% |
| $Y_2O_3$ | 0.3-6% |
| $La_2O_3$ | 0.1-1.5% |
| CaO + MgO + SrO | 12-22% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.55, and the weight percentage ratio $C2=(Li_2O+Na_2O+K_2O)/(Y_2O_3+La_2O_3)$ is greater than 0.22.

Composition 9

The composition for producing a high modulus glass fiber according to the present invention comprises the following components expressed as percentage amounts by weight:

| | |
|---|---|
| $SiO_2$ | 54-64% |
| Al2O3 | 14-24% |
| $Y_2O_3 + La_2O_3$ | 1.5-6% |
| $Y_2O_3$ | 1-5.5% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.6, and the weight percentage ratio $C2=(Li_2O+Na_2O+K_2O)/(Y_2O_3+La_2O_3)$ is greater than 0.22.

Composition 10

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | <12% |
| SrO | 0.1-1.5 |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5, and the weight percentage ratio $C2=(Li_2O+Na_2O+K_2O)/(Y_2O_3+La_2O)$ is greater than 0.2.

Composition 11

The composition for producing a high modulus glass fiber according to the present invention comprises the following components expressed as percentage amounts by weight:

| | |
|---|---|
| $SiO_2$ | 53-68% |
| $Al_2O_3$ | greater than 19% and less than or equal to 23% |
| $Y_2O_3 + La_2O_3$ | 0.1-8% |
| $La_2O_3$ | 0.05-1.7% |
| CaO + MgO + SrO | 10-23% |
| MgO | <11% |
| $Li_2O + Na_2O + K_2O$ | <1% |
| $Fe_2O_3$ | <1.5% |

In addition, the weight percentage ratio $C1=Y_2O_3/(Y_2O_3+La_2O_3)$ is greater than 0.5.

According to Composition 11, the resulting glass fiber has an elastic modulus greater than 95 GPa.

Composition 12

The composition for producing a high modulus glass fiber according to the present invention comprises the following components expressed as percentage amounts by weight:

| | |
|---|---|
| $SiO_2$ | 53-68% |
| $Al_2O_3$ | 13-24.5 |
| $Y_2O_3 + La_2O_3$ | 0.1-8% |
| $La_2O_3$ | 0.05-1.7% |
| CaO + MgO + SrO | 10-23% |
| MgO | greater than 12% and less than or equal to 14% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is greater than 0.5.

According to Composition 12, the resulting glass fiber has an elastic modulus greater than 95 GPa.

Composition 13

The composition for producing a high modulus glass fiber according to the present invention comprises the following components expressed as percentage amounts by weight:

| | |
|---|---|
| $SiO_2$ | 54-64% |
| $Al_2O_3$ | 14-24% |
| $Y_2O_3 + La_2O_3$ | 1.5-6% |

-continued

| | |
|---|---|
| $Y_2O_3$ | 1-5.5% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is 0.7-0.95, and the weight percentage ratio $C2=(Li_2O+Na_2O+K_2O)/(Y_2O_3+La_2O_3)$ is greater than 0.22.

According to Composition 13, the composition has a liquidus temperature less than or equal to 1300° C., preferably less than or equal to 1280° C., and more preferably less than or equal to 1230° C.; and the elastic modulus of the resulting glass fiber is 92-106 GPa.

Composition 14

The composition for producing a high modulus glass fiber according to the present invention comprises the following components expressed as percentage amounts by weight:

| | |
|---|---|
| $SiO_2$ | 54-64% |
| $Al_2O_3$ | 14-24% |
| $Y_2O_3 + La_2O_3$ | 1.5-6% |
| $Y_2O_3$ | 1-5.5% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

In addition, the weight percentage ratio $C1=Y_2O_3/(Y_2O_3+La_2O_3)$ is 0.7-0.95, and the weight percentage ratio $C2=(Li_2O+Na_2O+K_2O)/(Y_2O_3+La_2O_3)$ is greater than 0.26.

Composition 15

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | <1.8% |
| CaO + MgO + SrO | 10-23% |
| $Li_2O + Na_2O + K_2O$ | <2% |
| $Fe_2O_3$ | <1.5% |
| $TiO_2$ | 0.1-3% |
| SrO | 0-2% |
| $B_2O_3$ | 0-2% |

In addition, the weight percentage ratio $C1=Y_2O_3/(Y_2O_3+La_2O_3)$ is greater than 0.5.

Composition 16

The composition for producing a high modulus glass fiber according to the present invention comprises the following components expressed as percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | <1.8% |
| CaO + MgO + SrO | 10-23% |
| $Li_2O + Na_2O + K_2O$ | <2% |
| $Fe_2O_3$ | <1.5% |
| $CeO_2$ | 0-1% |

-continued

| | |
|---|---|
| $ZrO_2$ | 0-2% |
| SrO | 0.1-1.5% |

In addition, the weight percentage ratio $C1=Y_2O_3/(Y_2O_3+La_2O_3)$ is greater than 0.5.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the composition for producing a glass fiber expressed as percentage amounts by weight are: 53-68% $SiO_2$, 13-24.5% $Al_2O_3$, 0.1-8% $Y_2O_3$+$La_2O_3$, 1.8% $La_2O_3$, 10-23% CaO+MgO+SrO, less than 2% $Li_2O$+$Na_2O$+$K_2O$ and less than 1.5% $Fe_2O_3$, wherein the range of the weight percentage ratio $C1=Y_2O_3/(Y_2O_3+La_2O_3)$ is greater than 0.5. The composition can greatly increase the glass modulus, overcome such difficulties as high crystallization risk, high refining difficulty and low hardening rate of molten glass, noticeably reduce the liquidus and forming temperatures of glass, and significantly lower the glass crystallization rate and bubble rate, thus making it particularly suitable for high modulus glass fiber production with refractory-lined furnaces.

The specific content values of $SiO_2$, $Al_2O_3$, $Y_2O_3$, $La_2O_3$, CaO, MgO, $Li_2O$, $Na_2O$, $K_2O$, $Fe_2O_3$, $TiO_2$, SrO and $ZrO_2$ in the composition for producing a glass fiber of the present invention are selected to be used in the examples, and comparisons with S glass, traditional R glass and improved R glass are made in terms of the following six property parameters, (1) Forming temperature, the temperature at which the glass melt has a viscosity of 103 poise.

(2) Liquidus temperature, the temperature at which the crystal nucleuses begin to form when the glass melt cools off—i.e., the upper limit temperature for glass crystallization.

(3) ΔT value, which is the difference between the forming temperature and the liquidus temperature and indicates the temperature range at which fiber drawing can be performed.

(4) Peak crystallization temperature, the temperature which corresponds to the strongest peak of glass crystallization during the DTA testing. Generally, the higher this temperature is, the more energy is needed by crystal nucleuses to grow and the lower the glass crystallization tendency is.

(5) Elastic modulus, the linear elastic modulus defining the ability of glass to resist elastic deformation, which is to be measured as per ASTM2343.

(6) Amount of bubbles, to be determined in a procedure set out as follows: Use specific moulds to compress the glass batch materials in each example into samples of same dimension, which will then be placed on the sample platform of a high temperature microscope. Heat the samples according to standard procedures up to the pre-set spatial temperature 1500'C and then directly cool them off with the cooling hearth of the microscope to the ambient temperature without heat preservation. Finally, each of the glass samples is examined under a polarizing microscope to determine the amount of bubbles in the samples. A bubble is identified according to a specific amplification of the microscope.

The aforementioned six parameters and the methods of measuring them are well-known to one skilled in the art. Therefore, these parameters can be effectively used to explain the properties of the glass fiber composition of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirements.

The exemplary embodiments of the glass fiber composition according to the present invention are given below.

EXAMPLE 1

| | |
|---|---|
| $SiO_2$ | 59.3% |
| $Al_2O_3$ | 16.8% |
| CaO | 8.3% |
| MgO | 9.9% |
| $Y_2O_3$ | 1.8% |
| $La_2O_3$ | 0.4% |
| $Na_2O$ | 0.23% |
| $K_2O$ | 0.36% |
| $Li_2O$ | 0.75% |
| $Fe_2O_3$ | 0.44% |
| $TiO_2$ | 0.43% |
| SrO | 1.0% |

In addition, the weight percentage ratio $C1=Y_2O_3/(Y_2O_3+La_2O_3)$ is 0.82, and the weight percentage ratio $C2=(Li_2O+Na_2O+K_2O)/(Y_2O_3+La_2O_3)$ is 0.61.

In Example 1, the measured values of the six parameters are respectively:

| | |
|---|---|
| Forming temperature | 1299° C. |
| Liquidus temperature | 1203° C. |
| ΔT | 96° C. |
| Peak crystallization temperature | 1030° C. |
| Elastic modulus | 94.8 GPa |
| Amount of bubbles | 5 |

EXAMPLE 2

| | |
|---|---|
| $SiO_2$ | 59.2% |
| $Al_2O_3$ | 16.9% |
| CaO | 7.9% |
| MgO | 9.7% |
| $Y_2O_3$ | 3.3% |
| $La_2O_3$ | 0.5% |

-continued

| | |
|---|---|
| $Na_2O$ | 0.22% |
| $K_2O$ | 0.37% |
| $Li_2O$ | 0.75% |
| $Fe_2O_3$ | 0.44% |
| $TiO_2$ | 0.44% |

In addition, the weight percentage ratio $C1=Y_2O_3/(Y_2O_3+La_2O_3)$ is 0.87, and the weight percentage ratio $C2=(Li_2O+Na_2O+K_2O)/(Y_2O_3+La_2O_3)$ is 0.35.

In Example 2, the measured values of the six parameters are respectively:

| | |
|---|---|
| Forming temperature | 1298° C. |
| Liquidus temperature | 1197° C. |
| ΔT | 101° C. |
| Peak crystallization temperature | 1034° C. |
| Elastic modulus | 96.4 GPa |
| Amount of bubbles | 4 |

EXAMPLE 3

| | |
|---|---|
| $SiO_2$ | 58.8% |
| $Al_2O_3$ | 17.0% |
| CaO | 5.5% |
| MgO | 10.5% |
| $Y_2O_3$ | 5.0% |
| $La_2O_3$ | 0.6% |
| $Na_2O$ | 0.27% |
| $K_2O$ | 0.48% |
| $Li_2O$ | 0.75% |
| $Fe_2O_3$ | 0.43% |
| $TiO_2$ | 0.41% |

In addition, the weight percentage ratio $C1=Y_2O_3/(Y_2O_3+La_2O_3)$ is 0.89, and the weight percentage ratio $C2=(Li_2O+Na_2O+K_2O)/(Y_2O_3+La_2O_3)$ is 0.27.

In Example 3, the measured values of the six parameters are respectively:

| | |
|---|---|
| Forming temperature | 1305° C. |
| Liquidus temperature | 1205° C. |
| ΔT | 100° C. |
| Peak crystallization temperature | 1035° C. |
| Elastic modulus | 102.1 GPa |
| Amount of bubbles | 4 |

EXAMPLE 4

| | |
|---|---|
| $SiO_2$ | 57.8% |
| $Al_2O_3$ | 19.4% |
| CaO | 7.2% |
| MgO | 8.8% |
| $Y_2O_3$ | 3.7% |
| $La_2O_3$ | 0.6% |
| $Na_2O$ | 0.13% |
| $K_2O$ | 0.30% |
| $Li_2O$ | 0.55% |
| $Fe_2O_3$ | 0.44% |
| $TiO_2$ | 0.82% |

In addition, the weight percentage ratio $C1=Y_2O_3/(Y_2O_3+La_2O_3)$ is 0.93, and the weight percentage ratio $C2=(Li_2O+Na_2O+K_2O)/(Y_2O_3+La_2O_3)$ is 0.23.

In Example 4, the measured values of the six parameters are respectively:

| | |
|---|---|
| Forming temperature | 1310° C. |
| Liquidus temperature | 1196° C. |
| ΔT | 114° C. |
| Peak crystallization temperature | 1034° C. |
| Elastic modulus | 99.4 GPa |
| Amount of bubbles | 4 |

EXAMPLE 5

| | |
|---|---|
| $SiO_2$ | 59.5% |
| $Al_2O_3$ | 16.5% |
| CaO | 5.8% |
| MgO | 12.1% |
| $Y_2O_3$ | 3.4% |
| $La_2O_3$ | 0.4% |
| $Na_2O$ | 0.19% |
| $K_2O$ | 0.28% |
| $Li_2O$ | 0.70% |
| $Fe_2O_3$ | 0.44% |
| $TiO_2$ | 0.43% |

In addition, the weight percentage ratio $C1=Y_2O_3/(Y_2O_3+La_2O_3)$ is 0.89, and the weight percentage ratio $C2=(Li_2O+Na_2O+K_2O)/(Y_2O_3+La_2O_3)$ is 0.31.

In Example 5, the measured values of the six parameters are respectively:

| | |
|---|---|
| Forming temperature | 1296° C. |
| Liquidus temperature | 1216° C. |
| ΔT | 80° C. |
| Peak crystallization temperature | 1023° C. |
| Elastic modulus | 98.8 GPa |
| Amount of bubbles | 4 |

EXAMPLE 6

| | |
|---|---|
| $SiO_2$ | 59.3% |
| $Al_2O_3$ | 16.9% |
| CaO | 7.5% |
| MgO | 9.7% |
| $Y_2O_3$ | 3.1% |
| $La_2O_3$ | 0.4% |
| $Na_2O$ | 0.21% |
| $K_2O$ | 0.42% |
| $Li_2O$ | 0.71% |
| $Fe_2O_3$ | 0.44% |
| $TiO_2$ | 0.43% |
| SrO | 0.6% |

In addition, the weight percentage ratio $C1=Y_2O_3/(Y_2O_3+La_2O_3)$ is 0.89, and the weight percentage ratio $C2=(Li_2O+Na_2O+K_2O)/(Y_2O_3+La_2O_3)$ is 0.38.

In Example 6, the measured values of the six parameters are respectively:

| | |
|---|---|
| Forming temperature | 1296° C. |
| Liquidus temperature | 1198° C. |
| ΔT | 98° C. |
| Peak crystallization temperature | 1035° C. |
| Elastic modulus | 96.7 GPa |
| Amount of bubbles | 4 |

Comparisons of the property parameters of the aforementioned examples and other examples of the glass fiber composition of the present invention with those of the S glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1A

| | | A1 | A2 | A3 | A4 | A5 | A6 | A7 |
|---|---|---|---|---|---|---|---|---|
| Component | $SiO_2$ | 59.3 | 59.8 | 59.3 | 59.5 | 59.6 | 59.0 | 59.0 |
| | $Al_2O_3$ | 16.9 | 16.9 | 16.9 | 16.5 | 16.5 | 16.1 | 17.0 |
| | CaO | 7.5 | 8.0 | 8.1 | 5.8 | 5.1 | 9.1 | 8.1 |
| | MgO | 9.7 | 9.7 | 9.7 | 12.1 | 12.5 | 9.4 | 11.0 |
| | $Y_2O_3$ | 3.1 | 2.1 | 3.1 | 3.4 | 3.6 | 2.4 | 1.6 |
| | $La_2O_3$ | 0.4 | 0.4 | 0.4 | 0.4 | 0.4 | 1.0 | 0.7 |
| | $Na_2O$ | 0.21 | 0.21 | 0.21 | 0.19 | 0.22 | 0.23 | 0.23 |
| | $K_2O$ | 0.42 | 0.42 | 0.42 | 0.28 | 0.42 | 0.38 | 0.37 |
| | $Li_2O$ | 0.71 | 0.71 | 0.71 | 0.70 | 0.50 | 0.70 | 0.65 |
| | $Fe_2O_3$ | 0.44 | 0.44 | 0.44 | 0.44 | 0.44 | 0.44 | 0.44 |
| | $TiO_2$ | 0.43 | 0.43 | 0.43 | 0.43 | 0.43 | 0.42 | 0.44 |
| | SrO | 0.6 | 0.6 | — | — | — | — | — |
| Ratio | C1 | 0.89 | 0.84 | 0.89 | 0.89 | 0.90 | 0.71 | 0.70 |
| | C2 | 0.38 | 0.54 | 0.38 | 0.31 | 0.29 | 0.39 | 0.54 |
| Parameter | Forming temperature/° C. | 1296 | 1297 | 1295 | 1296 | 1298 | 1296 | 1290 |

TABLE 1A-continued

| | | A1 | A2 | A3 | A4 | A5 | A6 | A7 |
|---|---|---|---|---|---|---|---|---|
| | Liquidus temperature/° C. | 1198 | 1201 | 1205 | 1216 | 1223 | 1197 | 1210 |
| | ΔT/° C. | 98 | 96 | 90 | 80 | 75 | 99 | 80 |
| | Peak crystallization temperature/° C. | 1035 | 1032 | 1030 | 1023 | 1021 | 1033 | 1026 |
| | Elastic modulus/GPa | 96.7 | 95.2 | 95.7 | 98.8 | 99.6 | 95.4 | 94.4 |
| | Amount of bubbles/pcs | 4 | 4 | 4 | 4 | 5 | 2 | 3 |

TABLE 1B

| | | A8 | A9 | A10 | A11 | A12 | A13 | A14 |
|---|---|---|---|---|---|---|---|---|
| Component | $SiO_2$ | 59.6 | 59.3 | 62.1 | 59.1 | 57.0 | 57.8 | 59.2 |
| | $Al_2O_3$ | 16.9 | 16.8 | 15.7 | 14.9 | 21.1 | 19.4 | 15.5 |
| | CaO | 7.6 | 6.8 | 8.9 | 9.0 | 4.5 | 7.2 | 10.3 |
| | MgO | 9.6 | 11.2 | 9.4 | 10.6 | 10.0 | 8.8 | 9.6 |
| | $Y_2O_3$ | 3.1 | 3.5 | 1.1 | 2.4 | 3.5 | 3.7 | 1.9 |
| | $La_2O_3$ | 0.4 | 0.3 | 0.3 | 0.5 | 0.5 | 0.6 | 0.1 |
| | $Na_2O$ | 0.21 | 0.23 | 0.23 | 0.23 | 0.25 | 0.13 | 0.21 |
| | $K_2O$ | 0.41 | 0.51 | 0.42 | 0.38 | 0.34 | 0.30 | 0.43 |
| | $Li_2O$ | 1.00 | 0.20 | 0.80 | 0.75 | 0.75 | 0.55 | 0.70 |
| | $Fe_2O_3$ | 0.44 | 0.44 | 0.44 | 0.44 | 0.44 | 0.44 | 0.44 |
| | $TiO_2$ | 0.43 | 0.43 | 0.39 | 0.42 | 0.76 | 0.82 | 0.39 |
| | SrO | — | — | — | — | 0.6 | — | — |
| | $ZrO_2$ | — | — | — | — | — | — | 1.0 |
| Ratio | C1 | 0.89 | 0.92 | 0.79 | 0.83 | 0.88 | 0.93 | 0.95 |
| | C2 | 0.46 | 0.25 | 1.04 | 0.47 | 0.34 | 0.23 | 0.67 |
| Parameter | Forming temperature/° C. | 1292 | 1297 | 1297 | 1293 | 1306 | 1310 | 1295 |
| | Liquidus temperature/° C. | 1198 | 1207 | 1199 | 1197 | 1214 | 1196 | 1201 |
| | ΔT/° C. | 94 | 90 | 98 | 96 | 92 | 114 | 94 |
| | Peak crystallization temperature/° C. | 1032 | 1028 | 1031 | 1032 | 1023 | 1034 | 1028 |
| | Elastic modulus/GPa | 96.5 | 96.9 | 93.5 | 94.6 | 99.2 | 99.4 | 94.2 |
| | Amount of bubbles/pcs | 5 | 5 | 6 | 4 | 5 | 4 | 6 |

TABLE 1C

| | | A15 | A16 | A17 | A18 | S glass | Traditional R glass | Improved R glass |
|---|---|---|---|---|---|---|---|---|
| Component | $SiO_2$ | 58.8 | 59.3 | 59.3 | 59.2 | 65 | 60 | 60.75 |
| | $Al_2O_3$ | 17.0 | 16.7 | 16.8 | 16.9 | 25 | 25 | 15.80 |
| | CaO | 5.5 | 9.4 | 8.3 | 7.9 | — | 9 | 13.90 |
| | MgO | 10.5 | 9.7 | 9.9 | 9.7 | 10 | 6 | 7.90 |
| | $Y_2O_3$ | 5.0 | 1.6 | 1.8 | 3.3 | — | — | — |
| | $La_2O_3$ | 0.6 | 0.8 | 0.4 | 0.5 | — | — | — |
| | $Na_2O$ | 0.27 | 0.22 | 0.23 | 0.22 | trace amount | trace amount | 0.73 |
| | $K_2O$ | 0.48 | 0.38 | 0.36 | 0.37 | trace amount | trace amount | |
| | $Li_2O$ | 0.75 | 0.75 | 0.75 | 0.75 | — | — | 0.48 |
| | $Fe_2O_3$ | 0.43 | 0.44 | 0.44 | 0.44 | trace amount | trace amount | 0.18 |
| | $TiO_2$ | 0.41 | 0.43 | 0.43 | 0.44 | trace amount | trace amount | 0.12 |
| | SrO | — | — | 1.0 | — | — | — | — |
| Ratio | C1 | 0.89 | 0.67 | 0.82 | 0.87 | — | — | — |
| | C2 | 0.27 | 0.56 | 0.61 | 0.35 | — | — | — |

TABLE 1C-continued

| | | A15 | A16 | A17 | A18 | S glass | Traditional R glass | Improved R glass |
|---|---|---|---|---|---|---|---|---|
| Parameter | Forming temperature/° C. | 1305 | 1298 | 1299 | 1298 | 1571 | 1430 | 1278 |
| | Liquidus temperature/° C. | 1205 | 1200 | 1203 | 1197 | 1470 | 1350 | 1210 |
| | ΔT/° C. | 100 | 98 | 96 | 101 | 101 | 80 | 68 |
| | Peak crystallization temperature/° C. | 1035 | 1032 | 1030 | 1034 | — | 1010 | 1016 |
| | Elastic modulus/GPa | 102.1 | 94.0 | 94.8 | 96.4 | 89 | 88 | 87 |
| | Amount of bubbles/pcs | 4 | 3 | 5 | 4 | 40 | 30 | 25 |

It can be seen from the values in the above tables that, compared with the S glass and traditional R glass, the glass fiber composition of the present invention has the following advantages: (1) much higher elastic modulus; (2) much lower liquidus temperature, which helps to reduce crystallization risk and increase the fiber drawing efficiency; relatively high peak crystallization temperature, which indicates that more energy is needed for the formation and growth of crystal nucleuses during the crystallization process of glass, i.e. the crystallization risk of the glass of the present invention is smaller under equal conditions; (3) smaller amount of bubbles, which indicates a better refining of molten glass.

Both S glass and traditional R glass cannot enable the achievement of large-scale production with refractory-lined furnaces and, with respect to unproved R glass, part of the glass properties is compromised to reduce the liquidus temperature and forming temperature, so that the production difficulty is decreased and the production with refractory-lined furnaces could be achieved. By contrast, the glass fiber composition of the present invention not only has a sufficiently low liquidus temperature and crystallization rate which permit the production with refractory-lined furnaces, but also significantly increases the glass modulus, thereby resolving the technical bottleneck that the modulus of S glass fiber and R glass fiber cannot be improved with the growth of production scale.

The composition for producing a glass fiber according to the present invention can be used for making glass fibers having the aforementioned properties.

The composition for producing a glass fiber according to the present invention in combination with one or more organic and/or inorganic materials can be used for preparing composite materials having improved characteristics, such as glass fiber reinforced base materials.

Finally, what should be made clear is that, in this text, the terms “contain”, “comprise” or any other variants are intended to mean “nonexclusively include” so that any process, method, article or equipment that contains a series of factors shall include not only such factors, but also include other factors that are not explicitly listed, or also include intrinsic factors of such process, method, object or equipment. Without more limitations, factors defined by such phrase as “contain a . . . ” do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The composition for producing a glass fiber of the present invention not only has a sufficiently low liquidus temperature and crystallization rate which enable the production with refractory-lined furnaces, but also significantly increases the glass modulus, thereby resolving the technical bottleneck that the modulus of S glass fiber and R glass fiber cannot be improved with the enhanced production scale. Compared with the current main-stream high-modulus glasses, the glass fiber composition of the present invention has made a breakthrough in terms of elastic modulus, crystallization performance and refining performance of the glass, with significantly improved modulus; remarkably reduced crystallization risk and relatively small amount of bubbles under equal conditions. Thus, the overall technical solution of the present invention is particularly suitable for the tank furnace production of a high modulus glass fiber having a low bubble rate.

The invention claimed is:

1. A composition for producing a high modulus glass fiber, comprising the following components with corresponding percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | 0.05-1.7% |
| $CaO + MgO + SrO$ | 10-23% |
| $Li_2O + Na_2O + K_2O$ | <2% |
| $Fe_2O_3$ | <1.5% |

wherein a weight percentage ratio $C1=Y_2O_3/(Y_2O_3+La_2O_3)$ is greater than 0.5.

2. The composition of claim 1, wherein a weight percentage ratio $C1=Y_2O_3/(Y_2O_3+La_2O_3)$ is greater than 0.55.

3. The composition of claim 1, wherein a weight percentage ratio $C1=Y_2O_3/(Y_2O_3+La_2O_3)$ is between 0.7 and 0.95.

4. The composition of claim 1, wherein a weight percentage ratio $C2=(Li_2O+Na_2O+K_2O)/(Y_2O_3+La_2O_3)$ is greater than 0.2.

5. The composition of claim 1, comprising between 1.5 and 6 wt. % of $Y_2O_3+La_2O_3$.

6. The composition of claim 1, comprising between 0.1 and 1.5 wt. % of $Li_2O$.

7. The composition of claim 1, comprising between 8.1 and 12 wt. % of MgO.

8. The composition of claim 1, comprising greater than 12 and less than or equal to 14 wt. % of MgO.

9. The composition of claim 1, comprising less than 12 wt. % of CaO.

10. The composition of claim 1, comprising between 2 and 11 wt. % of CaO.

11. The composition of claim 1, comprising between 0.1 and 1.5 wt. % of SrO.

12. The composition of claim 1, comprising the following components with corresponding percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $La_2O_3$ | 0.05-1.7% |
| CaO + MgO + SrO | 10-23% |
| $Li_2O$ | 0.1-1.5% |
| $Li_2O + Na_2O + K_2O$ | <2% |
| $Fe_2O_3$ | <1.5% |

wherein a weight percentage ratio $C1=Y_2O_3/(Y_2O_3+La_2O_3)$ is greater than 0.5; and a weight percentage ratio $C2=(Li_2O+Na_2O+K_2O)/(Y_2O_3+La_2O_3)$ is greater than 0.2.

13. The composition of claim 1, comprising the following components with corresponding percentage amounts by weight:

| | |
|---|---|
| $SiO_2$ | 53-68% |
| $Al_2O_3$ | 13-24.5% |
| $Y_2O_3 + La_2O_3$ | 0.1-8% |
| $Y_2O_3$ | 0.1-6.3% |
| $La_2O_3$ | 0.05-1.7% |
| CaO + MgO + SrO | 10-23% |
| $Li_2O + Na_2O + K_2O$ | <2% |
| $Fe_2O_3$ | <1.5% |

wherein a weight percentage ratio $C1=Y_2O_3/(Y_2O_3+La_2O_3)$ is greater than 0.5; and a weight percentage ratio $C2=(Li_2O+Na_2O+K_2O)/(Y_2O_3+La_2O_3)$ is greater than 0.2.

14. The composition of claim 1, comprising the following components with corresponding percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | <12% |
| $Li_2O + Na_2O + K_2O$ | <2% |
| $Fe_2O_3$ | <1.5% |

wherein a weight percentage ratio $C1=Y_2O_3/(Y_2O_3+La_2O_3)$ is greater than 0.5; and a weight percentage ratio $C2=((Li_2O+Na_2O+K_2O)/(Y_2O_3+La_2O_3)$ is greater than 0.2.

15. The composition of claim 1, comprising the following components with corresponding percentage amounts by weight:

| | |
|---|---|
| $SiO_2$ | 53-68% |
| $Al_2O_3$ | 13-24.5% |
| $Y_2O_3 + La_2O_3$ | 0.5-7% |
| $Y_2O_3$ | 0.1-6.3% |
| $La_2O_3$ | 0.05-1.7% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

wherein a weight percentage ratio $C1=Y_2O_3/(Y_2O_3+La_2O_3)$ is greater than 0.5; and a weight percentage ratio $C2=(Li_2O+Na_2O+K_2O)/(Y_2O_3+La_2O_3)$ is greater than 0.2.

16. The composition of claim 1, comprising the following components with corresponding percentage amounts by weight:

| | |
|---|---|
| $SiO_2$ | 54-64% |
| $Al_2O_3$ | 14-24% |
| $Y_2O_3 + La_2O_3$ | 1.5-6% |
| $Y_2O_3$ | 1-5.5% |
| $La_2O_3$ | 0.1-1.5% |
| CaO + MgO + SrO | 10-23% |
| CaO | 2-11% |
| $Li_2O$ | 0.1-1.5% |
| $Li_2O + Na_2O + K_2O$ | <2% |
| $Fe_2O_3$ | <1.5% |

wherein a weight percentage ratio $C1=Y_2O_3/(Y_2O_3+La_2O_3)$ is greater than 0.6; and a weight percentage ratio $C2=(Li_2O+Na_2O+K_2O)/(Y_2O_3+La_2O_3)$ is greater than 0.22.

17. The composition of claim 1, comprising the following components with corresponding percentage amounts by weight:

| | |
|---|---|
| $SiO_2$ | 53-68% |
| $Al_2O_3$ | greater than 19% and less than or equal to 23% |
| $Y_2O_3 + La_2O_3$ | 0.1-8% |
| $La_2O_3$ | 0.05-1.7% |
| CaO + MgO + SrO | 10-23% |
| MgO | <11% |
| $Li_2O + Na_2O + K_2O$ | <1% |
| $Fe_2O_3$ | <1.5% |

wherein a weight percentage ratio $C1=Y_2O_3/(Y_2O_3+La_2O_3)$ is greater than 0.5.

18. A glass fiber, being produced using the composition of claim 1.

19. A composite material, comprising the glass fiber of claim 18.

* * * * *